United States Patent [19]
Dugast et al.

[11] Patent Number: 5,106,128
[45] Date of Patent: Apr. 21, 1992

[54] PIPE CONNECTOR, IN PARTICULAR FOR GASES

[75] Inventors: Joseph Dugast, Rouvres; Andre Sabatier, Villeneuve Saint Georges; Raymond De Praetere, Evry, all of France

[73] Assignee: C.G.M.I. Composants Gaz Pour La Microelectronique Internationale, Jouars Pontchartrain, France

[21] Appl. No.: 332,747

[22] Filed: Apr. 3, 1989

[30] Foreign Application Priority Data

Apr. 8, 1988 [FR] France .................. 88 04721

[51] Int. Cl.$^5$ .............................................. F16L 35/00
[52] U.S. Cl. ........................................ 285/93; 285/367
[58] Field of Search ............ 285/367, 366, 365, 373, 285/14, 93

[56] References Cited

U.S. PATENT DOCUMENTS

| | | | |
|---|---|---|---|
| 3,359,018 | 12/1967 | Simons | 285/367 |
| 3,403,931 | 10/1968 | Crain et al. | 285/367 X |
| 3,521,910 | 7/1970 | Callahan, Jr. et al. | 285/14 |
| 4,326,737 | 4/1982 | Lehmann | 285/365 X |
| 4,432,558 | 2/1984 | Westerlund et al. | 285/373 X |
| 4,496,176 | 1/1985 | Weinhold | 285/365 |
| 4,527,818 | 7/1985 | Rundell | 285/367 X |

FOREIGN PATENT DOCUMENTS

1040868  10/1953  France .................. 285/367

Primary Examiner—Dave W. Arola
Attorney, Agent, or Firm—Bucknam and Archer

[57] ABSTRACT

A pipe connector, in particular for high-purity gases and ultra-high vacuum or high-pressure systems, is provided with two end-pieces each having a coupling extremity. The connector is also provided with a special seal and a sleeve for maintaining the two end-pieces in the line of extension of each other in a first stage of assembly. Two half-shells are provided for longitudinal locking of the connector in a second stage of assembly.

4 Claims, 2 Drawing Sheets

PIPE CONNECTOR, IN PARTICULAR FOR GASES

BACKGROUND OF THE INVENTION

1. Field of the Invention

The present invention relates to the field of pipe connectors, in particular for high-purity gases, comprising two end-pieces each forming a coupling extremity so as to establish a leak-tight connection between two pipes. The invention is more particularly directed to the different elements which cooperate with the two end-pieces to be coupled together in order to achieve a high standard of leak-tightness between them while providing a simple and compact assembly.

2. Description of the Prior Art

Pipe-connecting devices in most common use up to the present time essentially comprise a male component engaged around an end-piece connected to a first pipe and a female component engaged on an end-piece connected to a second pipe, the two mounted components being intended to cooperate by screwing one onto the other in order to ensure leak-tight locking of the pipes by means of a seal.

Devices of this type with a male component and a female component have the disadvantage of involving torsion of the two end-pieces with respect to each other when they are locked in position by screwing as well as inconvenient assembly since it is necessary to engage the male and female components on the end-pieces in an initial stage. This design concept interferes in particular with the welding of short end-pieces on the pipes. Moreover, the male component which engages within the female component as a result of screwing action entails the need for a bulky connector and this may prove a disadvantage in locations which are not readily accessible. Finally, the mode of assembly is liable to result in a substantial release of particles which disturbs the clean environment often required in installations for the treatment of high-purity gases.

In order to produce connectors which make it possible to overcome the disadvantages mentioned in the foregoing, especially difficulties involved in assembly as well as problems of substantial bulk, it is necessary to permit positive clamping of the seal by accurate axial bearing without any torsional couple as well as to dispense with the need for two different types of end-piece (male and female) and thus to reduce the number of combinations of parts to be employed in order to mount all the connectors of a complete industrial installation.

Consideration may accordingly be given to connectors of the type described in patent No. DE-C-835,090, in which two half-shells located outside the end-pieces clamp these latter against each other without any rotation, the longitudinal locking action of said half-shells being such as to prevent any lateral and longitudinal displacement. This patent also proposes to interpose an intermediate sleeve between the half-shells and the extremities of the end-pieces.

Nevertheless, connectors designed in accordance with the cited patent still remain very imperfect, particularly in regard to precision requirements of installations for the transportation of high-purity gases. Leak-tightness is insufficient if no provision is made for compressing a seal between the end faces of the end-pieces whereas a conventional seal never comes into accurate correspondence with the internal surface of the end-pieces which delimit the axial passageway. Either the seal projects or else it is set back but this in any case produces stagnation zones which are conducive to deposition of dirt.

Furthermore, accurate axial alignment of the internal surfaces of the end-pieces is not possible if the sleeve remains freely mounted within the receiving cavity formed in the half-shells as in the cited patent. And the solution of a sleeve forcibly engaged on the two end-pieces would considerably complicate the assembly and subsequently hinder the clamping action which consists in thrusting the end faces of the end-pieces towards each other in order to ensure leak-tightness.

The present invention provides improvements to this type of connector, in particular by virtue of a special seal so designed as to guarantee an axial passageway without any hollow portion or projecting portion.

SUMMARY OF THE INVENTION

In accordance with the invention, a pipe connector, in particular for high-purity gases, comprising two end-pieces each having a coupling extremity, is essentially provided with a seal having an outer annular portion of smaller thickness and an inner annular portion of greater thickness.

The dimensions of a seal of this type are advantageously chosen so as to ensure that an inner circular periphery which limits the inner annular portion corresponds to a uniform flow cross-section limited by said end-pieces, when said seal is compressed between the two coupling extremities which are applied against each other.

The connector in accordance with the invention preferably has other distinctive features which are combined with those of the aforesaid seal in order to fulfill the requirements of a uniform flow cross-section and the absence of any zones of stagnation of a gas which flows through the connector.

In particular, the coupling extremities of the end-pieces each advantageously terminate in a radial end face which is flat and smooth along a transverse cross-ssection of the connector.

Furthermore, the connector is advantageously provided with an annular sleeve for maintaining said axial extremities in the line of extension of each other. Accordingly, the dimensions of the seal are advantageously set by the external periphery of the outer annular portion in relation to said sleeve so that this latter should ensure radial positioning of the seal between the end faces of the end-piece extremities while these latter are being applied against each other.

According to another distinctive feature of the invention, the connector is provided with means for applying the two end-pieces against each other, said means being constituted by two half-shells which can be rigidly fixed together so as to produce a longitudinal locking action on the two end-pieces, preferably in a manner which is separate and distinct from a radial positioning action on the two end-pieces, in the axial line of extension of each other which can be ensured by the holding sleeve mentioned earlier.

However, it must be understood that more than two half-shells could also be employed in an equivalent manner in order to constitute a complete annular shell which surrounds and clamps the connector assembly.

In accordance with a secondary feature of the invention, each half-shell has an internal chamfered portion which cooperates with the shape of the extremity of each end-piece in order to center said half-shell on the axis while at the same time applying a longitudinal clamping force on the end-pieces along the axis.

Advantageously, the holding sleeve is provided with a circumferential elasticity opening which facilitates accurate positioning of said sleeve around the end-piece extremities, in close contact with said extremities and under pressure.

In accordance with another secondary feature of the invention, the connector is provided with means for locking the two half-shells with respect to each other, said locking means being intended to carry out longitudinal clamping of the end-pieces against the seal whilst this latter is maintained centered on the axis with the end-pieces by means of the sleeve.

Finally, as an advantageous feature, at least one of the half-shells has a duct for detection of gas leakage.

BRIEF DESCRIPTION OF THE DRAWINGS

There now follows a detailed description of a particular embodiment which will serve to gain a clearer understanding of the essential characteristics of the invention but is given by way of example without any limitation being implied, reference being made to the accompanying drawings, in which.

DETAILED DESCRIPTION OF THE INVENTION

Figure 1:
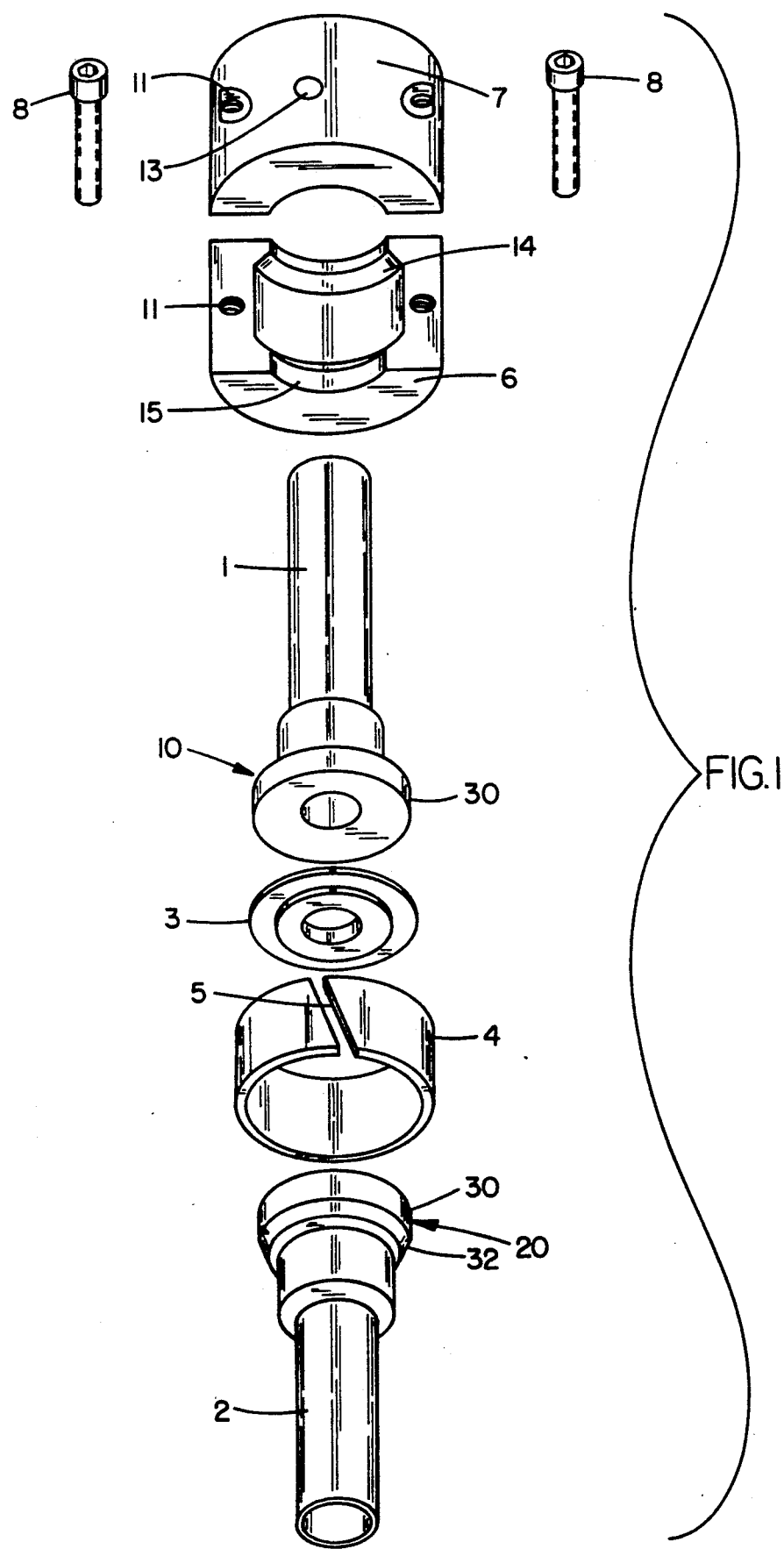
FIG. 1 is an exploded view illustrating the different constituent elements of a pipe connector in accordance with the invention.

FIG. 1 illustrates the pipe connector provided with its different constituent elements as shown in an exploded view. Two end-pieces 1, 2 each have a tubular portion 21, 22 to be welded respectively to two pipes to be connected and each tubular portion terminates in a coupling extremity 10, 20. The shape of said end-pieces is in accordance with the usual designs in devices which exist at the present time. Each coupling extremity 10, 20 terminates in a right section plane on a radial end face 31 which is flat and smooth and perpendicular to the axis of the connector.

The two terminal extremities 10, 20 which form part of the end-pieces 1 and 2 respectively are identical and their respective end faces can be placed opposite to each other so as to clamp between them a seal 3 constituted by a metal part having the shape of a washer. The external diameter of the seal corresponds precisely to that of the rings 30 and the internal diameter of its central orifice is such as to correspond practically to the diameter of the internal passageway of the tubular end-pieces 1 and 2, at least when the seal is tightly compressed between the two end faces.

The coupling system in accordance with the present invention comprises in addition an annular sleeve 4, the axial length of which is practically double that of the bearing ring 30 of an end-piece, or slightly less. The internal diameter of said annular sleeve is chosen so as to permit insertion of each end-piece extremity 10, 20 without play on each side of the seal 3. In order to facilitate this insertion while permitting clamping by pressure or close contact against the rings, the sleeve is split so as to form a slit 5 which endows it with resilience and is oriented slantwise with respect to its longitudinal axis. This annular sleeve serves to position the elements of the sealing system, that is to say the extremities of the two end-pieces to be connected together and the seal placed between the end rings, by holding them together in a position in which they are centered on the axis of the connector.

The first stage of assembly consists in placing the seal 3 axially within the sleeve 4 while ensuring that the extremities 10, 20 of the end-pieces 1, 2 to be joined together are engaged on each side until they are in contact with said seal. When the end-pieces are in this contact position, the annular sleeve ensures radial positioning of the two end-pieces in the line of extension of each other, said end-pieces being centered on the same axis as the seal which is interposed between them. The annular sleeve thus prevents any lateral displacement with respect to this reference axis but permits longitudinal displacement along the same axis. The advantage thus offered is that the user can readily engage the end-piece to be connected by sliding it in translational motion, without rotation, while holding the annular sleeve with one hand. Once the end-pieces have been engaged within the sleeve, the user can hold the assembly in one hand while leaving the other hand free to carry out the step which consists in locking the assembly in position.

The second stage of assembly consists in positioning two half-shells 6, 7 which cover the holding sleeve 4 in sliding relation with the end-pieces. Each half-shell 6, 7 has an internal recess corresponding to the half-volume of the annular holding sleeve 4 between two chamfered portions 14, 15 so shaped as to cooperate with frusto-conical bearing surfaces 32, 33 of the ring 30 of each extremity 10, 20 of the end-pieces 1, 2 to be coupled together. The two half-shells terminate in a flat face in a diametral plane so that they can be applied against each other.

When the end-pieces 10, 20 have been engaged within the sleeve, the two half-shells are placed in a position in which they are located in radially opposite relation while covering the annular sleeve 4 and the rings 30 of the two end-pieces on each side of their circular periphery. It is then necessary to draw the two half-shells together while clamping the sleeve and the rings. As a result of this radial movement of closure and the cooperation of the chamfered portions 14, 15 with the bearing surfaces 32, 33, the two end-pieces are moved towards each other in the axial direction while at the same time clamping the seal between them, the assembly being then locked in position in the longitudinal direction. To this end, lateral bores extend transversely through each half-shell 6, 7 in order to permit the engagement of fastening screws 8. Said screws pass via said bores right through the first half-shell and are screwed into the internally-threaded bores of the second half-shell.

The use of these two half-shells in cooperation with an annular holding sleeve permits assembly and coupling of the two end-pieces without entailing the need for any rotary torsional clamping system. Moreover, during the positive clamping action obtained by relative inward displacement of the two half-shells, the seal and the extremities of the end-pieces remain centered on the axis and accurately positioned by means of the presence of the annular sleeve 4. On the other hand, the two half-shells could be connected to each other by means equivalent to the screws mentioned above, in particular by making use of a hinge which connects the ends of two half-shells laterally and a system consisting of a rotatable locking-pin adapted to engage in a notch formed laterally in one half-shell. The same advantage as above would be retained . In other words, the two half-shells are placed in position on the connector which has been prepared in a longitudinal locking operation, without any need for preliminary engagement of any component around the end-pieces. The result thereby achieved is that the connector can often be assembled on end-pieces which have already been welded to the ends of their respective pipes.

Referring to FIG. 1, it will be recalled at this point that the annular holding sleeve 4 is split from one radial end face to the other so as to form a slit 5 which endows the sleeve with elasticity. It is thus possible to overcome all the phenomena of expansion during use, to produce an additional clamping action on the seal in the radial direction as will be explained below, and also to secure the sleeve against rotation in the second stage of assembly. Moreover, one of the half-shells is provided with a duct 13 for detecting gas leakage (shown in FIG. 1), leakages caused by failure of the seal 3 being permitted to escape through the opening 5 of the sleeve 4.

In accordance with the invention, the seal 3, which is a metal seal, has a special shape which enables it to perform two separate functions. In the first place, it cooperates longitudinally with the end-piece extremities between the smooth radial surface of a first end-piece and that of a second end-piece to be connected when they are drawn together under the action of the half-shells. In the second place, the seal is intended to cooperate with the sleeve 4 so as to maintain accurate positioning in the axis of the connector throughout the entire duration of assembly operations, then during use while avoiding any incidence of expansion phenomena.

Figure 2:
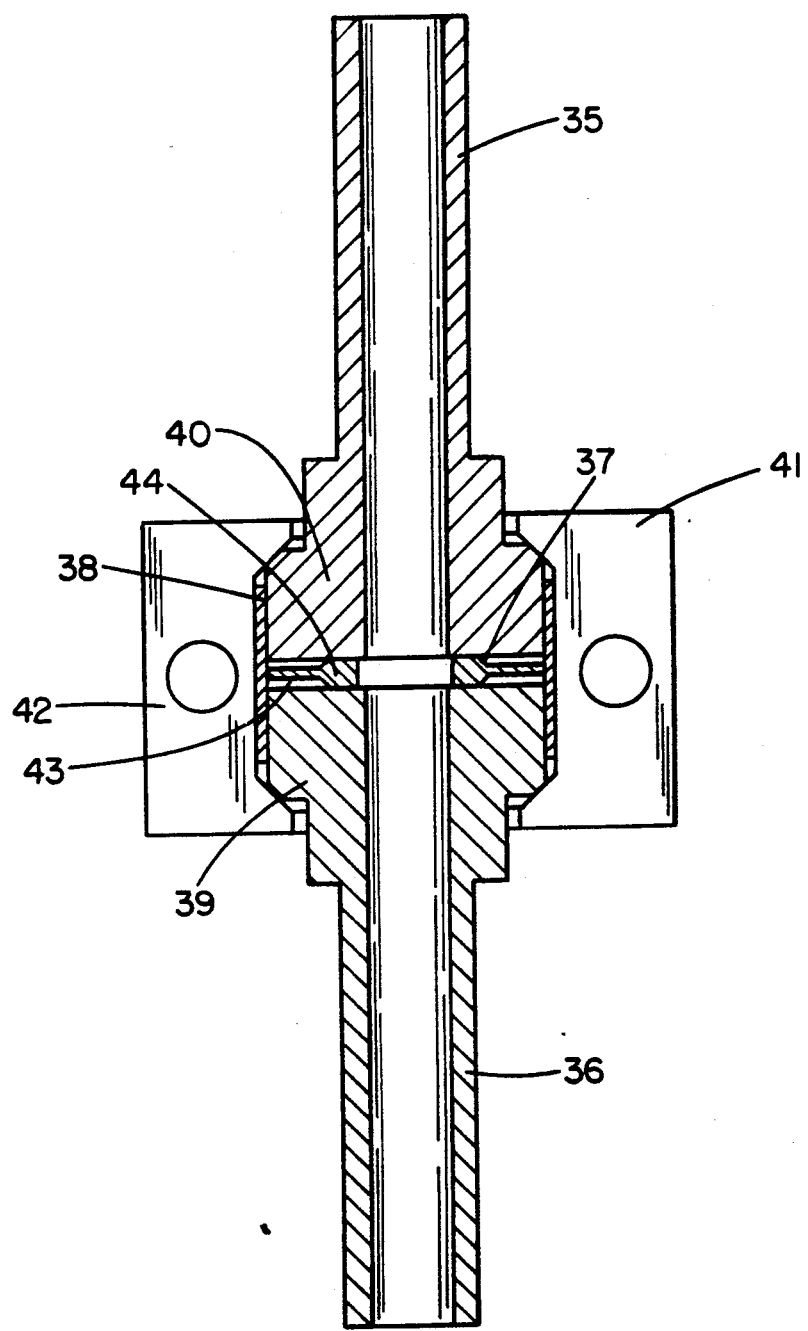
FIG. 2 is a longitudinal sectional view of the mounted pipe connector.

It is thus observed from a study of FIGS. 1 and 2 that the seal 3 has two annular portions having different thicknesses but forming a single part. Whereas the central portion of the seal extends over the entire annular cross-section of the end-piece extremities, there is also shown an outer annular portion 43 of relatively small thickness. The periphery of said outer annular portion is adapted to cooperate with the sleeve 4. On the inside of the connector, the seal is of greater thickness in its inner portion 44 and projects on each side of the outer portion 43 with respect to the central plane. It is at this point that leak-tightness is ensured in immediate proximity to the axial duct of the connector by bearing on a relatively small surface of the radial end faces of the two end-pieces at the time of axial clamping which compresses the seal elastically and selectively in its relatively thick inner portion. The axial passageway is thus continuous with a uniform flow cross-section throughout the length of the connector.

Since the axial clamping force is not exerted on the outer annular portion 43, there is no interference with the essential function of this latter. Similarly, at the time of radial positioning on the axis of the connector, the seal remains substantially rigid and accurately positioned whilst the sleeve 4 applies a resilient clamping force on the periphery of the outer portion 43 in the radial direction.

Connectors of the type described in the foregoing can find applications in piping installations for conveying gases and fluids. In the field of gases, the present invention is particularly applicable to high-pressure or low-pressure systems, all the advantages of this invention being again present in the event of use in a vacuum.

What is claimed is:

1. In a coupling system for pipes which comprises two tubular end pieces, said end pieces having an axis and end faces and each end piece having a coupling extremity terminating in a plane section perpendicular to said axis of said end pieces, said extremity having a shape and a seal located between said coupling extremities, means for connecting the two end pieces, said means being constituted by two half-shells adapted to be rigidly fixed together so as to produce a longitudinal locking action on said two end pieces, each half-shell having an internal chamfered portion which cooperates with the shape of the coupling extremity of each end piece whereby said half-shell is centered on the axis while at the same time a longitudinal clamping force is applied on the end pieces along the axis, the improvement wherein said seal has an outer annular portion of small thickness and an inner annular portion close to the internal diameter having a greater thickness than the outer annular portion, and an annular sleeve independent of said seal and engaging said extremity for holding said coupling extremities in line with each other, said annular sleeve having a circumferential opening which allows said sleeve to elastically expand and contract to engage said extremities whereby said annular sleeve ensures radial positioning of the seal between the end faces of the end pieces when said coupling extremities are connected to each other.

2. The coupling system according to claim 1 which is provided with means for locking said two half-shells in position with respect to each other, whereby said coupling extremities of the end pieces are clamped against the seal when said seal is maintained centered on the axis by means of the annular sleeve.

3. The coupling system according to claim 2, wherein at least one of said half-shells has a duct for detection of gas leakage.

4. The method of assembling a coupling system between two pieces, said coupling system comprising two tubular end pieces, said end pieces having an axis and end faces and each end piece having a coupling extremity terminating in a plane section perpendicular to said axis of said end pieces, said extremity having a shape and a seal located between said coupling extremities, means for connecting the two end pieces, said means being constituted by two half-shells adapted to be rigidly fixed together so as to produce a longitudinal locking action on said two end pieces, each half-shell having an internal chamfered portion which cooperates with the shape of the coupling extremity of each end piece whereby said half-shell is centered on the axis while at the same time a longitudinal clamping force is applied on the end pieces along the axis, and said seal has an outer annular portion of small thickness and an inner annular portion close to the internal diameter having a greater thickness than the outer annular portion, and an annular sleeve independent of said seal and engaging said extremity for holding said coupling extremities in line with each other, said annular sleeve having a circumferential opening which allows said sleeve to elastically expand and contract to engage said extremities whereby said annular sleeve ensures radial positioning of the seal between the end faces of the end pieces when said coupling extremities are connected to each other, which consists of placing said seal axially within said annular sleeve while ensuring that the coupling extremities of the end pieces to be joined together are engaged on each side until they are in contact with said seal, said shape on said end pieces defined by a bearing ring which has frusto-conical bearing surfaces, positioning said two half-shells in sliding relation with the end pieces, each half-shell having an internal recess corresponding to one half volume of the annular sleeve between said two chamfered portions, so shaped as to cooperate with said frusto-conical bearing surfaces of the ring of each coupling extremity of the end pieces to be coupled together, fastening the two half-shells together while clamping the sleeve and the rig and moving the two end pieces toward each other in the axial direction.

* * * * *